(12) United States Patent
Rodrigues de Miranda

(10) Patent No.: US 6,404,582 B1
(45) Date of Patent: Jun. 11, 2002

(54) ROBUST INDEX REFERENCE POSITION DETECTION USING A SEQUENCE OF SUCCESSIVELY DISPOSED INDEX FIELDS

(75) Inventor: Hans J. Rodrigues de Miranda, Yukon, OK (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/395,411

(22) Filed: Sep. 14, 1999

Related U.S. Application Data

(60) Provisional application No. 60/100,190, filed on Sep. 14, 1998.

(51) Int. Cl.⁷ .............................................. G11B 5/596
(52) U.S. Cl. ........................................ 360/77.08; 360/49
(58) Field of Search ................................ 360/77.08, 39, 360/48, 49, 51, 53

(56) References Cited

U.S. PATENT DOCUMENTS

| | | | |
|---|---|---|---|
| 4,584,622 A | | 4/1986 | Crosby et al. |
| 4,933,786 A | | 6/1990 | Wilson |
| 4,956,727 A | * | 9/1990 | Bezinque et al. ............. 360/49 |
| 5,047,880 A | * | 9/1991 | Ohno ..................... 360/78.14 |
| 5,136,439 A | | 8/1992 | Weispfenning et al. |
| 5,162,954 A | | 11/1992 | Miller et al. |
| 5,262,907 A | | 11/1993 | Duffy et al. |
| 5,585,976 A | | 12/1996 | Pham |
| 5,737,145 A | | 4/1998 | Jung |
| 5,777,816 A | | 7/1998 | Hampshire et al. |
| 5,818,654 A | | 10/1998 | Reddy et al. |
| 5,828,508 A | * | 10/1998 | Whaley et al. ............... 360/49 |
| 5,903,410 A | | 5/1999 | Blaum et al. |
| 5,978,170 A | * | 11/1999 | Izumiya et al. ........... 360/49 X |
| 6,038,097 A | * | 3/2000 | Le et al. .............. 360/77.08 X |
| 6,104,558 A | * | 8/2000 | Greenberg et al. ............ 360/49 |

* cited by examiner

*Primary Examiner*—David Hudspeth
*Assistant Examiner*—K. Wong
(74) *Attorney, Agent, or Firm*—Crowe & Dunlevy

(57) ABSTRACT

Apparatus and method for improving index reference position detection on a disc of a disc drive. The disc includes servo fields used by a servo circuit to control position of a head adjacent the disc and data fields used to store user data, with at least one data field between each successive pair of servo fields. Each servo field includes a binary index field used to indicate angular position. A multi-bit index detection word is selected having at least two bits at a first logical state and at least two bits at a second logical state. A plurality of index fields leading up to, and including a selected index field at the index reference position, are written with respective patterns corresponding to the logical sequence of the index detection word. As the disc rotates, the servo circuit reads each of the successive index fields and identifies the index reference position upon detection of the index detection word.

14 Claims, 5 Drawing Sheets

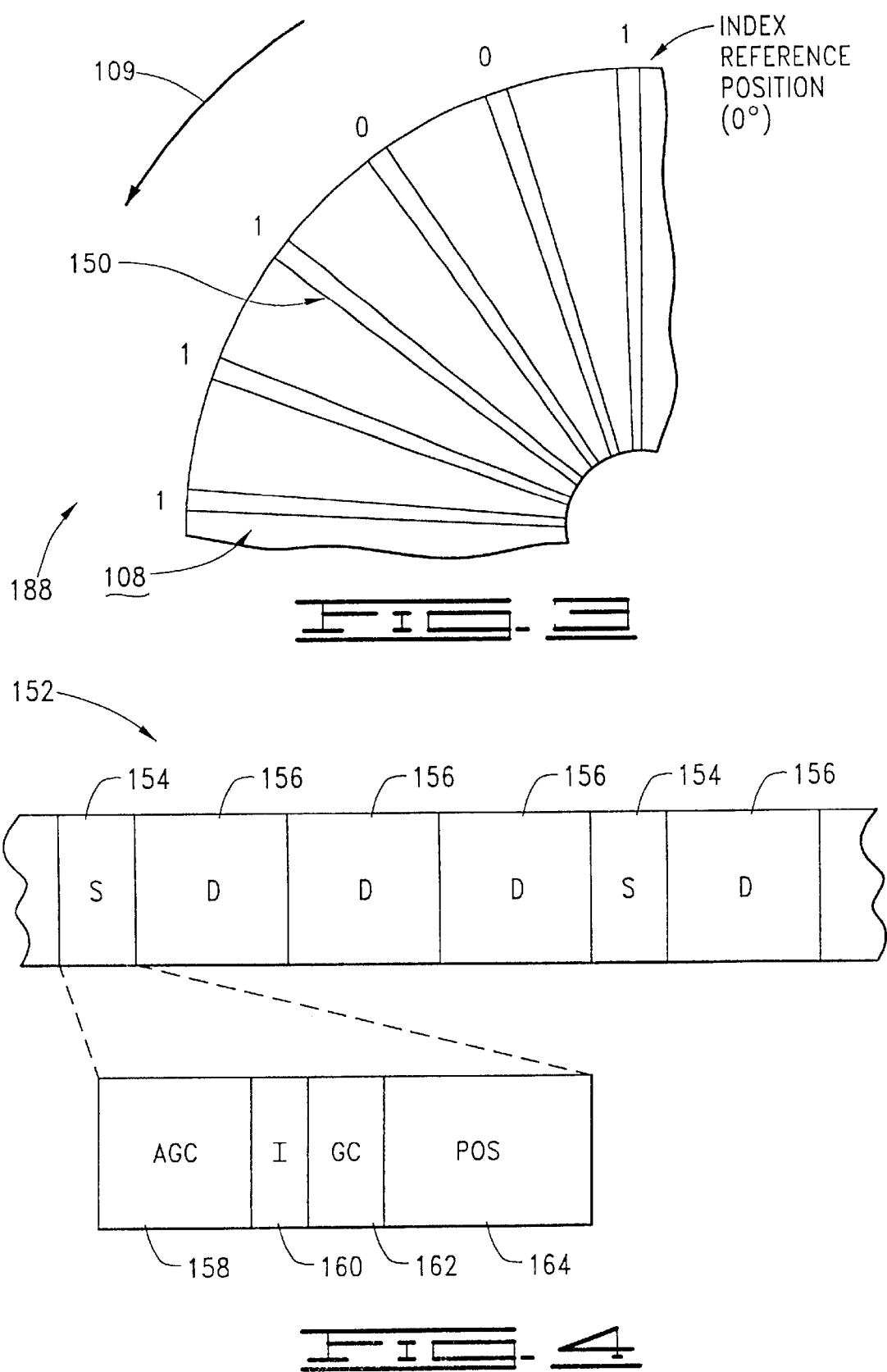

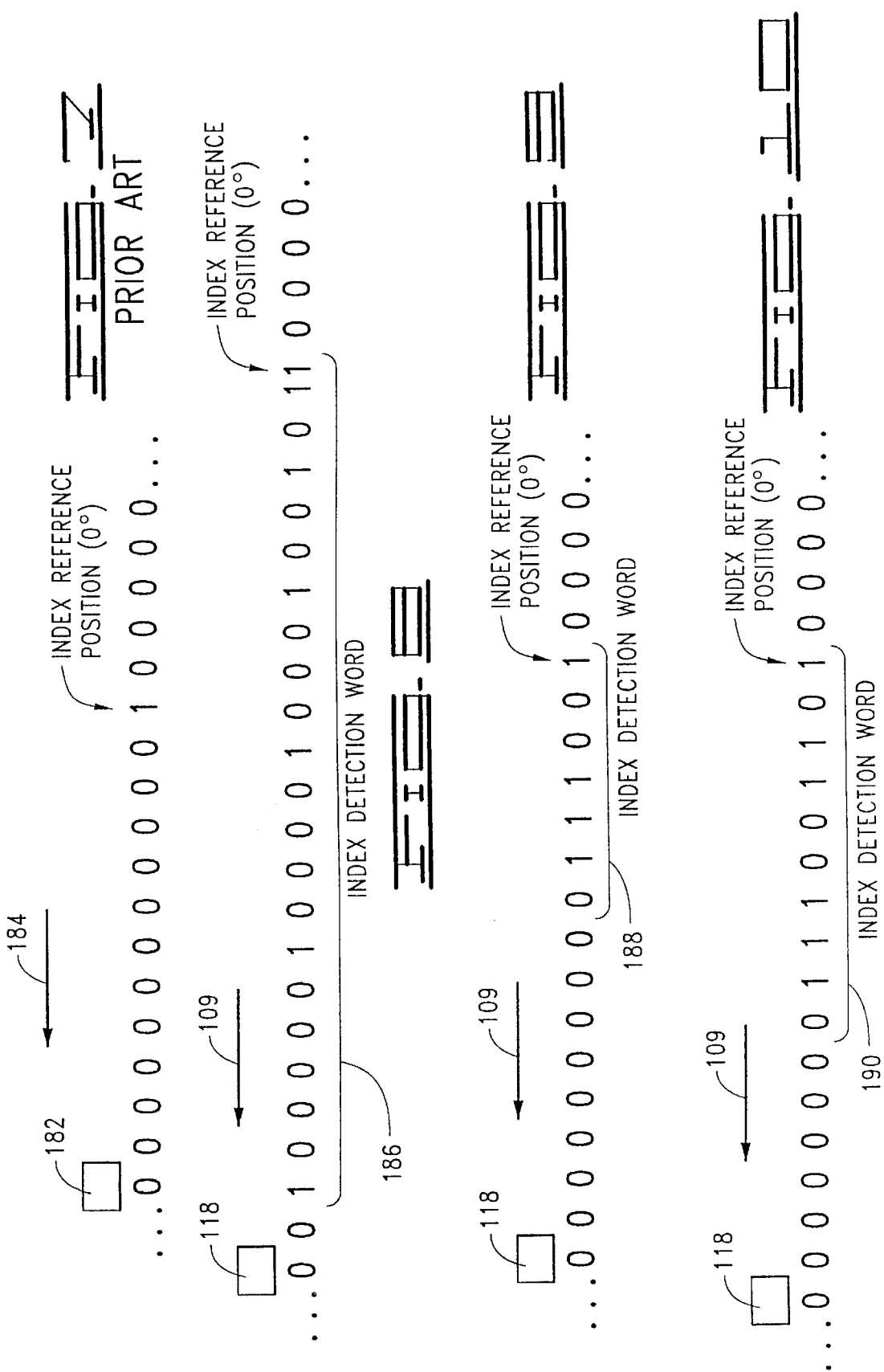

ROBUST INDEX REFERENCE POSITION DETECTION USING A SEQUENCE OF SUCCESSIVELY DISPOSED INDEX FIELDS

RELATED APPLICATIONS

This application claims priority to Provisional Application No. 60/100,190 filed Sep. 14, 1998.

FIELD OF THE INVENTION

This invention relates generally to the field of disc drive storage devices, and more particularly, but not by way of limitation, to improvements in the detection of angular position of a magnetic recording disc.

BACKGROUND OF THE INVENTION

Disc drives are commonly used as the primary data storage and retrieval devices in modern computer systems. In a typical disc drive, user data are magnetically stored on one or more discs that are rotated at a constant high speed and accessed by a rotary actuator assembly having a plurality of read/write heads that fly adjacent the surfaces of the discs. A read channel and interface circuit are provided to recover previously stored data from the discs to the host computer.

A closed loop digital servo system such as disclosed in U.S. Pat. No. 5,262,907 issued Nov. 16, 1993 to Duffy et al., assigned to the assignee of the present invention, is typically used to control the position of the heads relative to tracks on the discs. The tracks are defined from servo data written to the surfaces of the discs during manufacturing. The servo system of a disc drive utilizes the servo data to maintain the selected head over a particular track so that the user data can be transferred to and from user data fields defined on the tracks. The servo system further uses the servo data to control the movement of the head from one track to another during a seek operation.

As will be recognized, modern disc drives typically employ an embedded servo scheme wherein the servo data are arranged in angularly spaced servo fields which extend as a plurality of servo wedges across the disc surfaces, like spokes of a wheel. The user data fields (or "sectors") are subsequently defined on the tracks between successively occurring servo fields during a formatting operation. As the sampling rate of the servo data is typically insufficient to maintain the heads within predetermined off track boundaries, the servo system uses a multi-rate observer to provide estimates of head position, velocity and bias at times when the heads are disposed over the user data fields. Such observers (or "estimators") are well known in the art and are discussed, for example, in U.S. Pat. No. 5,585,976 issued Dec. 17, 1996 to Pham, assigned to the assignee of the present invention.

Each servo field typically includes an automatic gain control (AGC) field with an oscillating pattern that tunes the servo system for receipt of the remaining servo data in the servo field. An index field indicates angular position of the disc. A track address field indicates radial position on the disc by storing a unique track address sequence for each track (typically expressed in Gray code). A position field provides a plurality of servo burst patterns which, when transduced by the head, provide burst signals that can be combined to provide a position error signal (PES) indicative of intra-track position.

Of particular interest is the index field which enables the servo system to determine the location of the "starting point" on the track as the track rotates underneath the head. This starting point is referred to as an "index reference position" and can be thought of as representing an angular position of zero degrees (0°) on the circular disc. It is desirable to restrict as far as practicable the amount of disc surface area needed by the servo data in order to increase the surface area available to store user data (to achieve greater data storage capacity). For reference, the ratio of area occupied by servo data as compared to the total amount of disc surface area used to store both servo data and user data is sometimes referred to as "servo overhead," and typically ranges from 6–8%.

Thus, to reduce servo overhead, index fields have typically been made as small as practicable and have been provided with one of two different magnetically stored patterns: a "non-index" pattern which is used for all of the index fields on the track that do not correspond to the index reference position (i.e., are not at the 0° position) and an "index" pattern which is used to identify the servo field that corresponds to the index reference position (i.e., the one field at the 0° position). If the non-index field pattern is characterized as a logical zero (0), and the index field is characterized as a logical one (1), then the servo system will "look" for the logical one (1) pattern as the successive index field portions of the servo fields on a particular track pass under the head.

While using relatively short, binary state index field patterns advantageously allows greater user data storage capacity, a problem can arise if an anomalous condition (such as a grown thermal asperity) prevents the servo system from detecting the index reference position. If angular position information is not otherwise available, the disc drive may be unable to retrieve previously stored user data on the affected track. To address this problem, prior art methodologies have introduced the use of non-binary state index field patterns, such as patterns with an informational content similar to the track address field, that provide an indication of the particular angular location of each index field. However, the additional information content of such patterns undesirably require a lengthening of each index field, increasing servo overhead and reducing the available data storage capacity of the disc drive.

Accordingly, there is a need for improvements in the art to enable disc drives to detect index reference position in a disc drive without increasing the amount of servo overhead. It is to such improvements that the present invention is directed.

SUMMARY OF THE INVENTION

The present invention is directed to an apparatus and method for improving detection of index reference position in a disc drive.

In accordance with preferred embodiments, a disc includes servo fields used by a servo circuit to control position of a head adjacent the disc and data fields used to store user data, with at least one data field between each successive pair of servo fields. Each servo field includes a binary index field used to indicate angular position on the disc.

A multi-bit index detection word is selected having at least two bits at a first logical state (such as logical 0) and at least two bits at a second logical state (such as logical 1). A plurality of index fields leading up to, and including a selected index field at the index reference position, are written with respective patterns corresponding to the logical sequence of the index detection word. As the disc rotates, the servo circuit reads each of the successive index fields and identifies the index reference position upon detection of the index detection word.

By using multiple, successive binary state index fields to identify the index reference position, increased robustness is obtained without the requirement for additional servo overhead.

These and various other features as well as advantages which characterize the present invention will be apparent from a reading of the following detailed description and a review of the associated drawings.

BRIEF DESCRIPTION OF THE DRAWINGS

FIG. 3 illustrates the manner in which servo data are preferably arranged on the discs of the disc drive of FIG. 1.

FIG. 4 is a representation of a portion of a track of the disc of FIG. 3 illustrating the respective arrangement of servo data fields and user data fields, as well as a preferred format for the servo data fields.

FIG. 7 provides a representation of the logical states of a sequence of index fields in accordance with the prior art.

FIG. 8 provides a representation of a first multi-bit index detection word made up of selected logical states for a subset of index fields that lead up to an index reference position for the discs of the disc drive of FIG. 1.

FIG. 9 provides a representation of a second multi-bit index detection word made up of selected logical states for a subset of index fields that lead up to the index reference position.

FIG. 10 provides a representation of a third multi-bit index detection word made up of selected logical states for a subset of index fields that lead up to the index reference position.

DETAILED DESCRIPTION

Figure 1:
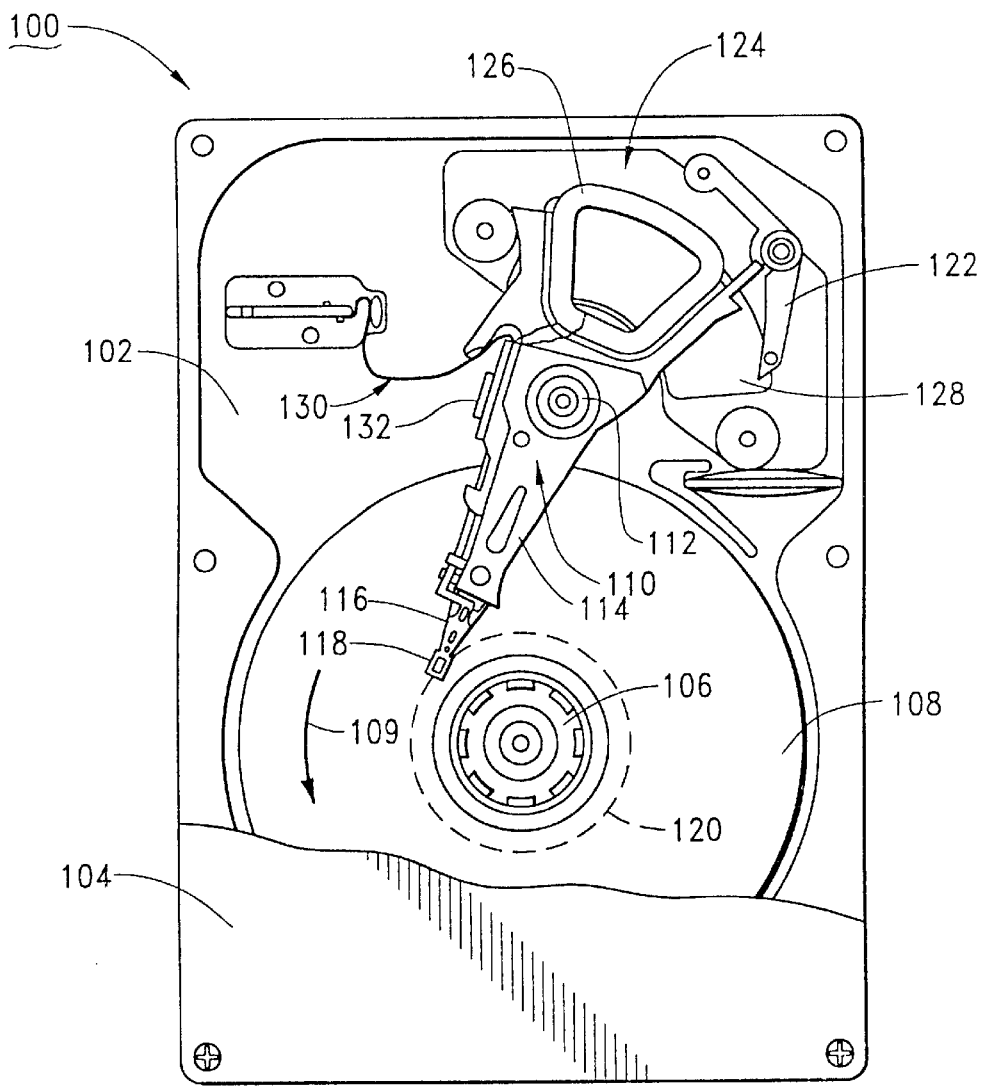
FIG. 1 shows a top plan view of a disc drive constructed in accordance with preferred embodiments of the present invention.

In order to provide a detailed description of various preferred embodiments of the present invention, reference is first made to FIG. 1, which provides a top plan view of a disc drive 100 of the type used to interface with a host computer to magnetically store and retrieve user data. The disc drive 100 includes a base deck 102 to which various components of the disc drive 100 are mounted. A top cover 104 (shown in partial cutaway fashion) cooperates with the base deck 102 to form an internal, sealed environment for the disc drive.

A spindle motor (shown generally at 106) is provided to rotate a plurality of axially-aligned, rigid, magnetic recording discs 108 at a constant high speed (in thousands of revolutions per minute) in an angular direction denoted by arrow 109. User data are written to and read from tracks (not designated) on the discs 108 through the use of an actuator assembly 110, which rotates about a bearing shaft assembly 112 positioned adjacent the discs 108.

The actuator assembly 110 includes a plurality of rigid actuator arms 114 which extend toward the discs 108, with flexible suspension assemblies 116 (flexures) extending therefrom. Mounted at the distal end of each of the flexures 116 is a head 118 which includes a slider assembly (not separately designated) designed to fly in close proximity to the corresponding surface of the associated disc 108. The heads 118 are preferably characterized as magneto-resistive (MR) heads each having a thin-film inductive write element and an MR read element.

When the disc drive 100 is not in use, the heads 118 are moved over and come to rest upon landing zones 120 near the inner diameter of the discs 108 and the actuator assembly 110 is secured using a magnetic latch assembly 122.

The radial position of the heads 118 is controlled through the use of a voice coil motor (VCM) 124, which includes a coil 126 attached to the actuator assembly 110 as well as a permanent magnet 128 which establishes a magnetic field in which the coil 126 is immersed. A second magnetic flux path is disposed above the permanent magnet 128, but has not been shown for purposes of clarity. The heads 118 are moved across the surfaces of the discs 108 through the application of current to the coil 126.

A flex assembly 130 provides the requisite electrical connection paths for the actuator assembly 110 while allowing pivotal movement of the actuator assembly 110 during operation. The flex assembly 130 includes a preamplifier/driver circuit 132 (preamp) which applies write currents to the write elements of the heads 118 during a write operation and applies read bias currents to the MR read elements of the heads 118 during a read operation. The preamp 132 further amplifies readback signals obtained during a read operation and provides the same to disc drive control electronics (not shown) disposed on a disc drive printed circuit board (PCB) attached to the underside of the base deck 102.

Figure 2:
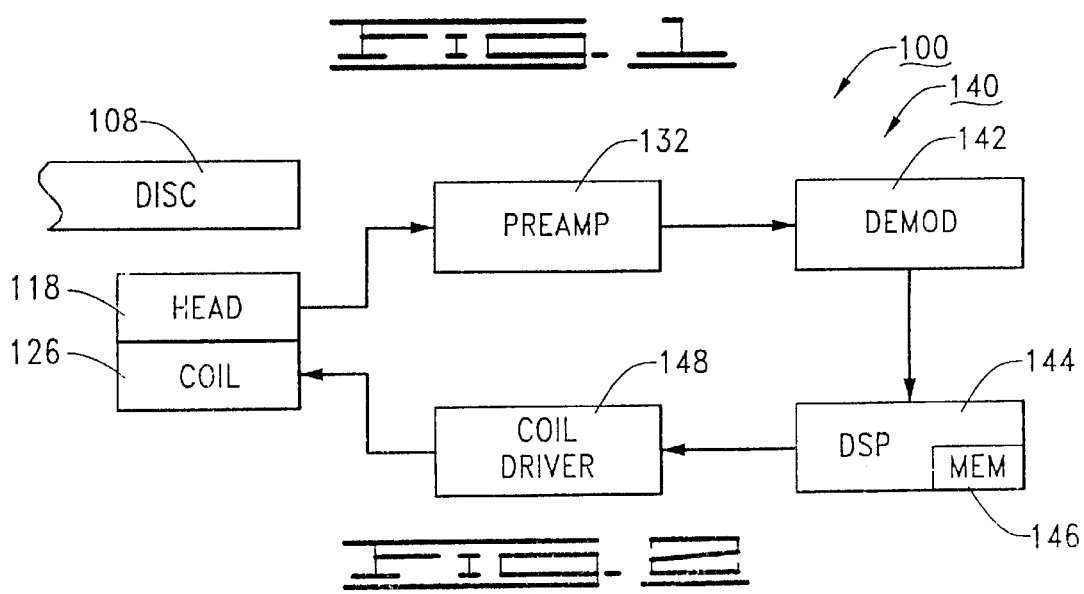
FIG. 2 provides a functional block diagram of a servo circuit of the disc drive of FIG. 1.

FIG. 2 shows a functional block diagram of a servo circuit 140 of the disc drive 100 of FIG. 1 which uses servo data arranged on the discs 108 to control the position of the heads 118. The servo data are transduced by the selected head 118, preamplified by the preamp 132, and provided to a demodulation circuit 142 which conditions the servo data for processing by a servo processor 144, which preferably comprises a digital signal processor (DSP). The DSP 144 uses programming steps stored in DSP memory 146 (MEM) as well as commands issued by a top-level disc drive processor (not shown) to output current command signals to coil driver circuitry 148 which, in turn, adjusts the amount of current applied to the coil 126.

Figure 5:
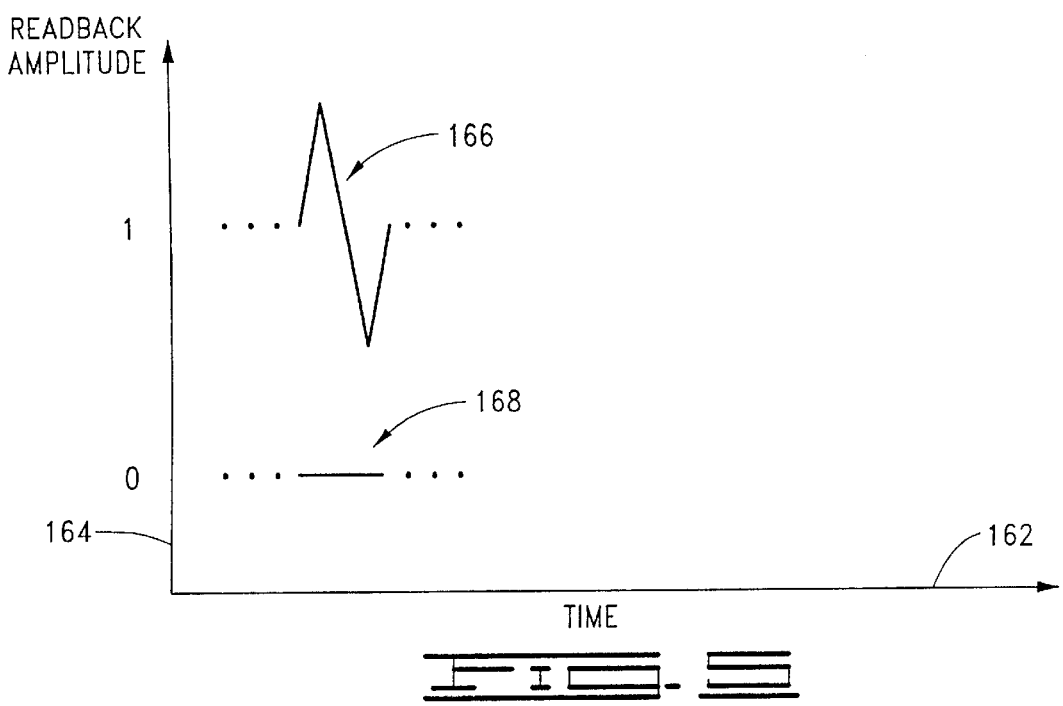
FIG. 5 is a graphical representation of a first set of readback signals obtained from respective index field patterns in accordance with a preferred embodiment of the present invention.

The servo data are preferably arranged on the discs 108 as shown in FIGS. 3–5. FIG. 3 provides a portion of a selected one of the discs 108 with a plurality of servo wedges 150 which radially extend from the innermost to the outermost radii of the disc recording surface. The servo wedges 150 are written during disc drive manufacturing and each servo wedge comprises a plurality of radially aligned servo fields, with each servo field corresponding to a particular track on the disc surface. As will be recognized, user data are stored in the areas between adjacent servo wedges. While the number of servo wedges 150 will vary depending upon the application, for purposes of the present discussion it will be contemplated that there are a total of 100 such wedges on each disc surface.

FIG. 4 shows a portion of a track 152 at a selected radius on the disc 108, illustrating the arrangement of respective servo fields 154 and user data fields 156. Each servo field 154 preferably includes an automatic gain control (AGC) field 158, an index field 160, a Gray code (GC) field 162 and a position (POS) field 164. The AGC field 158 provides an oscillating signal that prepares the servo circuit 140 for remaining portions of the servo field 154, the GC field 162 provides a unique track address to indicate radial position for the track, and the POS field 164 provides an arrangement of servo patterns that allows the servo circuit 140 to perform intra-track positioning. It will be apparent that other servo field configurations can be readily employed.

In accordance with preferred embodiments of the present invention, the index fields 160 are provided with one of two different (binary) magnetically stored patterns: a "non-index" pattern which corresponds to a logical zero (0), and an "index" pattern which corresponds to a logical one (1). For example, FIG. 5 provides graphical representations of one exemplary set of readback signals obtained from such binary index patterns, plotted against an x-axis 162 representative of elapsed time and a y-axis 164 indicative of readback signal amplitude. A logical 1 pattern is written using a positive magnetic flux transition followed by a negative magnetic flux transition (sometimes referred to as a di-bit pattern), thereby providing a readback signal as shown at 166. A logical 0 pattern is indicated by an absence of any magnetic flux transitions, resulting in a baseline readback signal as shown at 168.

Figure 6:
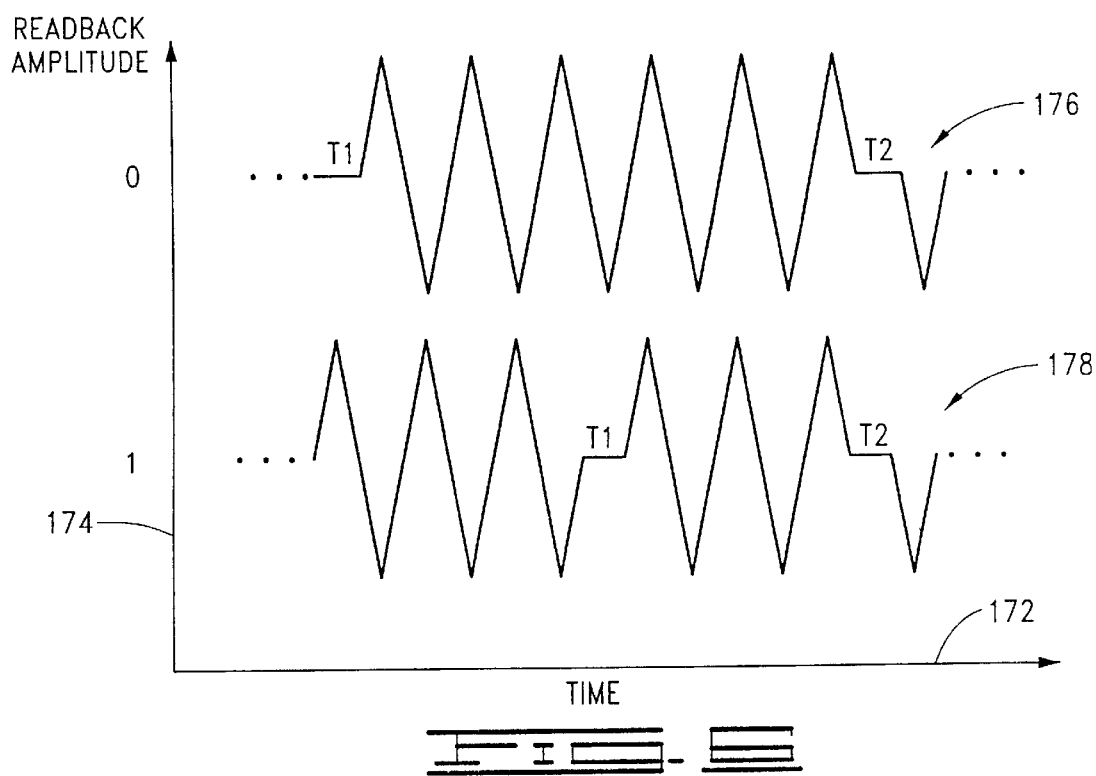
FIG. 6 is a graphical representation of a second set of readback signals obtained from respective index field patterns in accordance with an alternative preferred embodiment of the present invention.

FIG. 6 provides graphical representations of another exemplary set of readback signals obtained from such binary index patterns, plotted against an elapsed time x-axis 172 and a readback signal amplitude y-axis 174. Readback signals for the logical 0 and the logical 1 patterns are respectively shown at 176, 178. Both signals include one-half cycle (180°) delays (denoted as timing marks T1, T2), with the number of cycles between the T1 and T2 marks being different for the respective signals.

Since the first mark $T_1$ causes subsequent peaks in the readback signal to "flip" polarity, the logical 0 and 1 patterns are detected in relation to the number of detected out-of-phase peaks between $T_1$ and $T_2$ (i.e., six positive peaks for the logical 0 pattern and three positive peaks for the logical 1 pattern shown in FIG. 6). It will be noted that although the patterns represented by FIG. 6 are of greater length than the patterns of FIG. 5, both are still relatively short in duration and both take one of two available states. Thus, the patterns shown in FIGS. 5 and 6 are merely illustrative in nature and the claimed invention can be practiced with a variety of other available binary patterns, depending upon the requirements of a given application. It will be appreciated that the patterns represented by FIG. 5 are particularly advantageous in that the index pattern can be incorporated into the GC field 162, with the logical 0 and logical 1 patterns being set as the most significant bits (MSB) of the Gray code track address sequence. In this way, the Gray code detection operation (performed by the demod 142 of FIG. 2) can also be used as the front end of the index pattern detection operation.

As discussed above, the use of relatively short, binary patterns for the index fields such as shown in FIGS. 5 and 6 advantageously reduces servo overhead by minimizing as much as practicable the size of each index field. In the prior art, the logical 1 pattern has been used in a single index field to identify the index reference position (0° on the disc), with the logical 0 pattern used in all of the remaining index fields. Such a prior art sequence of patterns is illustrated by FIG. 7.

To provide a directional reference, the sequence of index fields in FIG. 7 passes under a head 182 (nominally identical to the heads 118 discussed above) in a direction indicated by arrow 184 (corresponding to arrow 109 discussed above). During operation, the prior art servo circuit examines each successive index field, and identifies the index reference position (0°) when the logical 1 pattern is found. However, as will be recognized, the presence of a defect that prevents detection of the single logical 1 pattern may result in an inability to recover the user data stored on the track. The individual data fields (as shown in FIG. 4) are typically assigned logical addresses that correspond to physical locations (radial and angular position). Thus, loss of an angular reference, if not otherwise available on the track, can prevent proper identification of (and access to) the data fields on the track.

Accordingly, the present invention provides an apparatus and method whereby additional index fields leading up to the index field corresponding to the index reference position are provided with selected binary states to define an index detection word that indicates the location of the index reference position. Unlike the prior art where the informational content is included in the individual index fields, it is the combination of binary states among a succession of separate index fields that provides the informational content to identify the index reference position. Various alternative preferred index detection words will be discussed as follows.

FIG. 8 presents an index detection word 186 comprising a sequence of logical 1 and 0 patterns wherein, as the index reference position approaches, the logical 1 patterns become increasingly frequent. The example word includes a total of 22 bits, or separate index fields, with the remaining 78 index fields 160 around the circumference of the disc being provided with logical 0 patterns. Thus, in this embodiment the servo circuit 140 reads each successive index field 160 and initiates a countdown that enables the servo circuit 140 to calculate the location of the final bit in the index detection word (i.e., that field corresponding to the index reference position) long before the final bit arrives.

FIG. 9 presents an alternative index detection word 188 expressed as the pattern "0111001" (as before, the remaining index fields are coded with logical 0 patterns). The word 188 was determined using a computerized search to obtain maximum Hamming and Euclidean distances for all bit-shifted combinations of the word. As will be recognized, the Hamming distance between two sequences is the total number of different bits in each of the sequences. The Euclidean distance is the square of the Hamming distance. Thus, increasing the Hamming and Euclidean distances provides a greater assurance that the sequence will be readily distinguishable over all other sequences that will be presented to the decoder circuitry (in this case, the servo circuit 140).

The seven-bit index detection word 188 of FIG. 9 is fault tolerant, in that the location of the final bit (corresponding to the index reference position) can still be determined even in the presence of one read error; that is, the index reference position will still be identified even if one of the logical 1s in the word 188 is misdetected as a logical 0, or vice versa. For reference, FIG. 3 maps the seven bits of the index detection word 188 to the seven radially extending servo wedges 150 shown therein.

FIG. 10 provides a ten-bit index detection word 190 having a bit pattern "0111001101" (as before, the remaining index fields are coded with logical 0 patterns). The word 190 is determined in a similar fashion as the word 188 of FIG. 9, but the word 190 allows identification of the final bit in the presence of two read errors in the logical 0 and 1 patterns. Thus, even if two of the respective patterns making up the word 190 are misdetected, the servo circuit 140 will still be able to identify the location of the index reference position. It will be recognized that other sequences for the index detection words in addition to those shown in FIGS. 8–10 can readily be employed in accordance with the claimed invention.

Figure 11:
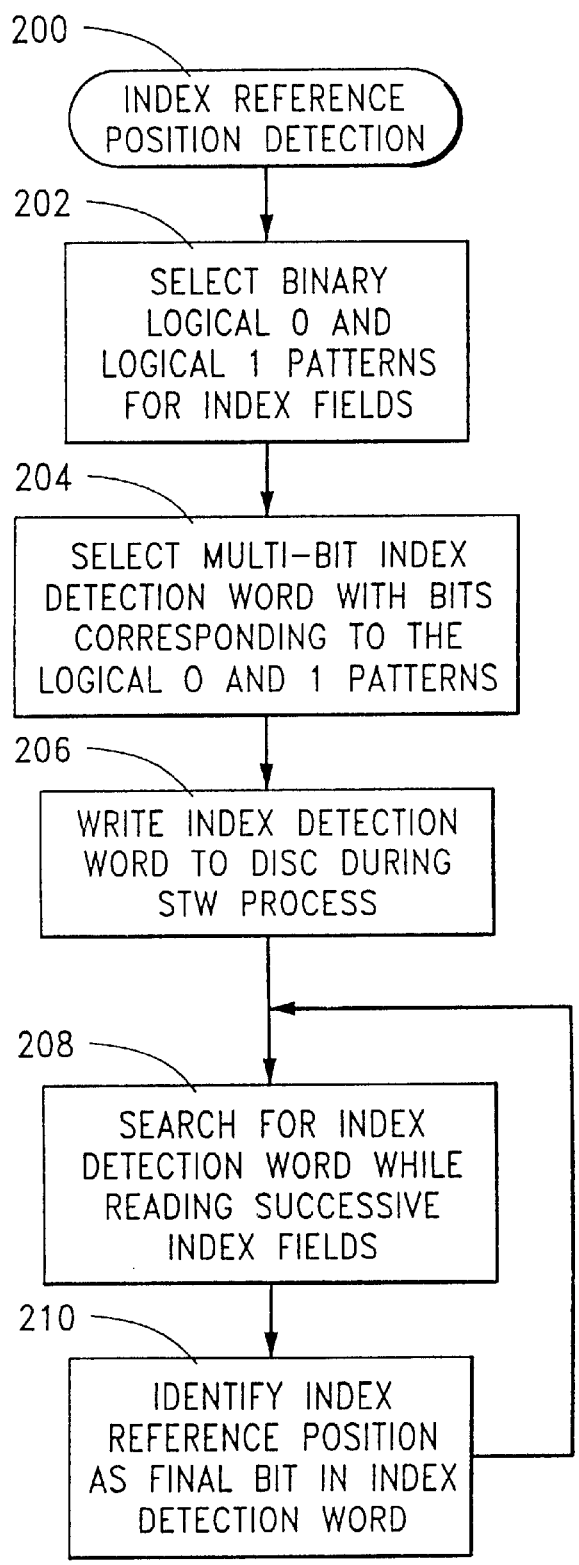
FIG. 11 provides a flow chart for an INDEX REFERENCE POSITION DETECTION routine, illustrating steps carried out in accordance with preferred embodiments of the present invention to detect the index reference position.

FIG. 11 provides a flow chart for an INDEX REFERENCE POSITION DETECTION routine 200, illustrating steps carried out in accordance with preferred embodiments of the present invention to detect the index reference position (0°) on the surface of each disc 108.

The binary (logical 0 and logical 1) patterns to be used to denote the two different states for the index fields 160 are first identified, as shown by step 202. These patterns can take any number of forms, such as the patterns 166, 168 in FIG. 5 or the patterns 176, 178 in FIG. 6, as long as the two patterns can be distinguished by the servo circuit 140 (i.e., the servo circuit 140 is capable of decoding one pattern as a logical 0 and the other pattern as a logical 1). Of course, as discussed above it is advantageous to use as short a pattern length as practicable to reduce required servo overhead.

Next, at step 204 a multi-bit index detection word is selected. Examples include the words 186, 188 and 190 of FIGS. 8–10, although other words can readily be selected depending on the requirements of a given application. It will be noted that each of the examples presented herein have used a default logical pattern for the remaining index fields 160 not part of the index detection word; that is, all of the "non-word" index fields 160 of FIGS. 8–10 have been coded with a logical 0 pattern. Moreover, each of the examples presented herein have used the remaining logical pattern (logical 1) in the final bit location of the detection word. Such constraints are not necessarily required, but generally will increase the ability to detect the index reference position.

However, to distinguish over the prior art sequence of FIG. 7, which might arguably be viewed as a 100 bit index detection word comprising 99 logical 0s followed by a logical 1 (or some subset thereof), the detection word selected by the operation of step 204 will comprise a sequence of bits with at least two logical 0s and at least two logical 1s. The word 186 of FIG. 8 uses 15 logical 0s and eight logical 1s; the word 188 of FIG. 9 uses two logical 0s and four logical 1s; and the word 190 of FIG. 10 uses four logical 0s and six logical 1s.

From a practical standpoint, if the non-word index fields 160 are coded as logical 0s and the index reference position is coded as a logical 1, a fault-tolerant index detection word will likely require at least three logical 1s. For example, if only two logical 1s are used and one of these logical 1s is misdetected as a logical 0, it would not necessarily be clear whether the remaining logical 1 that is properly detected corresponds to the first or the second logical 1 in the word.

Continuing with the routine of FIG. 11, once the bit pattern for the index detection word is selected, the index detection word is written to the disc 108 at step 206. This will preferably occur during a servo track writing (STW) process during disc drive manufacturing wherein each of the servo wedges 150 (FIG. 3) are written to the disc using a highly precise, closed loop servo track writer.

Thereafter, during normal disc drive operation as the selected head 118 follows a particular track, the servo circuit will search for the index detection word from the sequence of index fields 160 on the track, step 208, and will identify the index reference position therefrom, step 210, enabling the disc drive 100 to transfer data between the data blocks 156 on the track and the host computer in which the disc drive is mounted. Thus, the routine of FIG. 11 is shown to loop back through steps 208 and 210, indicating that these two steps are continually performed as the disc drive operates in a track following mode.

It will now be clear that the present invention is directed to an apparatus and method for improving index reference position detection on a disc of a disc drive. In accordance with preferred embodiments, a disc 108 includes servo fields 154 used by a servo circuit 140 to control position of a head 118 adjacent the disc and data fields 156 used to store user data, with at least one data field between each successive pair of servo fields. Each servo field includes a binary index field 160 used to indicate angular position.

A multi-bit index detection word 186, 188, 190 is selected (step 204) having at least two bits at a first logical state and at least two bits at a second logical state. A plurality of index fields leading up to, and including a selected index field at the index reference position, are written with respective patterns corresponding to the logical sequence of the index detection word (step 206). As the disc rotates, the servo circuit reads each of the successive index fields and identifies the index reference position upon detection of the index detection word (steps 208, 210).

For purposes of the appended claims, it will be understood that the index reference position can be a starting disc position (such as 0°), but the index reference position can readily be another angular position at a known, given distance from the starting disc position so that, once the index reference position is determined by the index detection word, the disc drive can readily determine the starting disc position thereafter. The scope of the method claims is not necessarily limited to the order of the steps set forth.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for detecting an index reference position on a rotatable disc of a disc drive, comprising steps of:

(a) selecting first and second disc recording patterns;

(b) transducing the first and second disc recording patterns to produce respective first and second readback signals;

(c) assigning a first logical state to the first readback signal and a second logical state to the second readback signal;

(d) defining an index detection word as an n-bit sequence with at least two bits at the first logical state and at least two bits at the second logical state;

(e) arranging the index detection word on the disc by writing the first and second recording patterns to n successive index fields along a selected track on the disc with user data fields defined between successive index fields so that readback signals transduced from the index fields provide a sequence of logical states that correspond to the n-bit sequence of the index detection word; and (f) identifying the index reference position upon detection of the index detection word.

2. The method of claim 1, wherein the identifying step (f) comprises identifying the index reference position as a selected distance from a final bit in the index detection word.

3. The method of claim 1, further comprising a prior step of defining m index fields along the selected track, with m greater than n, and wherein the arranging step (e) further comprises writing a selected one of the first and second recording patterns to the remaining m-n index fields to provide the remaining index fields with a default logical state.

4. The method of claim 3, wherein the arranging step (e) further comprises providing a final index field associated with a final bit in the index detection word with a logical state opposite the default logical state.

5. The method of claim 1, wherein the defining step (d) comprises a step of selecting the index detection word to have a maximum Hamming distance from all bit-shifted combinations of said word.

6. The method of claim 1, wherein the defining step (d) comprises a step of arranging the n-bit sequence in the index detection word so that at least two bits at the first logical state are immediately adjacent and at least two bits at the second logical state are immediately adjacent in said word.

7. The method of claim 1, wherein the selecting step (a) comprises a step of selecting the respective first and second recording patterns to each comprise a plurality of successive di-bit patterns.

8. A disc drive, comprising:

a head configured for magnetic coupling with a rotatable disc on which a plurality of tracks are defined, each track comprising servo fields and user data fields with at least one user data field disposed between each successive pair of servo fields, wherein each servo field includes an index field, wherein a selected index field corresponds to an index reference position on the disc, and wherein n successive index fields preceding and including the selected index field have respective binary patterns which, when transduced, provide respective readback signals with respective first or second logical states, the sequence of logical states of the n successive index fields defining an n-bit index detection word, the n successive index fields including at least two index fields providing readback signals at the first logical state and at least two index fields providing readback signals at the second logical state; and a servo circuit, operably coupled to the head, which controls the position of the head in response to the servo fields, the servo circuit identifying the index reference position in response to detection of the index detection word.

9. The disc drive of claim 8, therein a total m servo fields are disposed on each track with m greater than n, wherein a selected one of the binary patterns is written to the remaining m-n index fields, and wherein the remaining one of the binary patterns is written to the selected index field.

10. The disc drive of claim 8, wherein the servo fields include track address fields which store track address patterns that uniquely identify each track on the disc, and wherein the index fields comprise most significant bit locations in each of the track address fields.

11. The disc drive of claim 8, wherein the n-bit index detection word is selected to have a maximum Hamming distance from all bit-shifted combinations of said word.

12. The disc drive of claim 8, wherein the n-bit detection word is selected so that at least two bits at the first logical state are immediately adjacent and at least two bits at the second logical state are immediately adjacent in said word.

13. The disc drive of claim 8, wherein the respective readback signals with the respective first or second logical states each comprise a plurality of positive and negative peaks.

14. A disc drive, comprising:

a rotatable disc; and index reference position detection means for detecting an index reference position on the disc.

* * * * *